Sept. 17, 1968    W. W. R. SEARLE    3,401,571
ELECTRIC MOTOR DRIVE FOR WASHING MACHINES
Filed Nov. 30, 1966

United States Patent Office 3,401,571
Patented Sept. 17, 1968

3,401,571
ELECTRIC MOTOR DRIVE FOR
WASHING MACHINES
Walter William Ralph Searle, Beaconsfield, England, assignor to The Hoover Company, North Canton, Ohio, a corporation of Delaware
Filed Nov. 30, 1966, Ser. No. 598,045
Claims priority, application Great Britain, Dec. 1, 1965, 51,018/65
6 Claims. (Cl. 74—336)

This invention relates to electric motor drives for washing machines.

The invention is concerned with applications in which an electric motor is available that can be run at either of two different speeds that are comparatively close to one another whereas it is required to drive a driven member at two different speeds that are very much more widely spaced. For example in the case of a washing machine in which a container for clothes is required to be rotated at quite a low speed for rinsing and washing, but at a much higher speed for spin drying, the ratio of the spinning speed to the washing speed of the container might perhaps be 14 to 1. An induction motor can conveniently be run either as a 4 pole motor or as a 2 pole motor thus providing a speed ratio of 2 to 1.

In such an application the invention employs a gear unit of the type including a change speed gear having high and low ratios, and high and low speed clutches arranged to engage the high ratio when the power unit runs at its high speed and the low ratio when it runs at low speed.

An object of the invention is to provide a compact and self-contained mechanical arrangement of such a drive.

According to the present invention an electric motor drive, for driving a part of a washing machine at either of two widely different speeds, includes a pole-changing motor having a pulley or other output wheel mounted rotatably on its shaft, a low ratio transmission connecting the shaft to the output wheel and including a centrifugal clutch (referred to as the low-speed clutch member) of friction type mounted on the shaft, and a high ratio transmission connecting the shaft to the output wheel and including a further centrifugal clutch (referred to as the high-speed clutch member) mounted on the shaft, and a centrifugal device for engaging the high-speed clutch and disengaging the low-speed clutch when the motor speed exceeds a predetermined value and vice versa. Conveniently the low-ratio transmission includes a reduction gear situated between the output wheel and the motor, having a reaction member connected to the motor casing.

Preferably the low-speed clutch is connected to the output side of the reduction ratio transmission so as to operate at relatively high torque and low speed. It is of course possible to employ a low-speed clutch on the input side of the reduction ratio transmission, so as to operate at relatively high torque and low speed. Such an arrangement has the disadvantage that the reduction gear is then permanently connected to the output member, so that when the latter is running at high speed the driven member of the low-speed clutch will be driven at an even higher speed. For example in a specific embodiment it might be rotating at a speed of the order of 20,000 r.p.m. This difficulty is avoided without complication by connecting the low-speed clutch to the output side of the reduction ratio transmission.

Preferably the high-speed clutch is situated on the side of the output wheel remote from the motor. Conveniently the driving member of the high-speed clutch is secured to the motor shaft.

The low speed clutch is also on the side of the output remote from the motor. The clutches have a common driven member, which is axially movable but is connected to drive the output wheel without moving it axially. Thus the clutches comprises a high speed driving clutch member and a low speed driving clutch member spaced from it, and, interposed between them, a common driven clutch member which is mounted to be shifted axially to engage either of them. In one such arrangement an actuating spider is mounted to rotate relatively to but move axially with the common driven clutch member, and is connected to the high speed driving clutch member by powerful springs tending to engage the low speed clutch, and by centrifugal weights tending to engage the high speed clutch, so that the forces exerted by the springs and by the weights are directly balanced and only their resultant is transmitted to the driven clutch member.

Conveniently the low-speed clutch driving member is connected to the output of the reduction gear by a sleeve or hollow shaft surrounding the motor shaft and passing through the output wheel. Thus in one arrangement the output wheel is mounted to rotate on a bearing on the sleeve and is also provided with means preventing it from moving axially relatively to the sleeve and low speed clutch driving member. The output wheel may be formed integrally with a shell or casing at least partially enclosing the clutches, and the driven clutch member may have portions projecting peripherally through an annular gap between the high-speed and low-speed clutch driving members and connected, by means permitting relative axial movement but not relative rotation, to the output wheel. For example the shell may carry a number of pins extending parallel to the axis through bores in a peripheral portion of the driven clutch member which can slide axially on the said pins.

In a preferred arrangement comparatively light springs are interposed between the driven clutch member and the shell, tending to move the latter relatively to the former towards the motor, and the sleeve is provided with a bearing engaging a shoulder on the motor shaft so as to limit movement of the shell and sleeve towards the motor relatively to the shaft, whereby axial forces on the shaft are balanced between the said shoulder and the means securing the high speed clutch driving member to the end of the shaft. In this way the complete assembly is held together with springs taking up any clearances, and yet no relative axial force is applied to the motor shaft. The complete drive, providing two widely different speeds, has the parts carried almost wholly by the motor shaft, without involving complex manufacture or assembly and without resulting in a construction in which the belt tension exerts an excessive bending moment on the shaft.

It is an additonal object of my invention to provide a speed change gear unit wherein the low speed ratio drive comprises a gear train which may be operated with lubricating oil which is contained by a housing surrounding the gears but the clutches are the dry friction type which for a given size are capable of transmitting more torque than if they were lubricated. This provides for a small compact system which is mounted entirely on the driving motor.

These and other objects of my invention are more fully set forth in the accompanying specifications and drawings in which.

Figure 1:
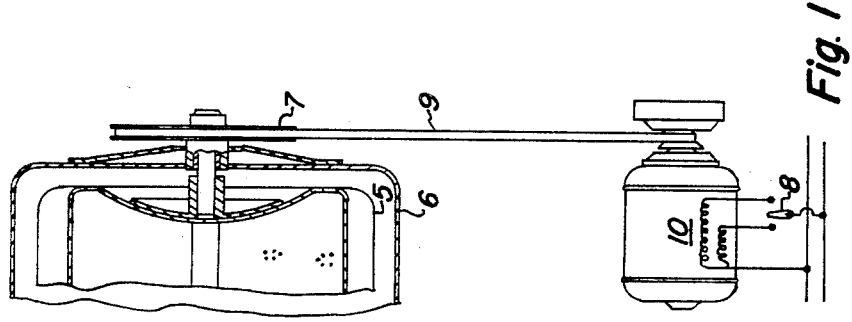
FIGURE 1 is a diagrammatic view of washing machine showing the application of my electric motor drive.
Figure 2:
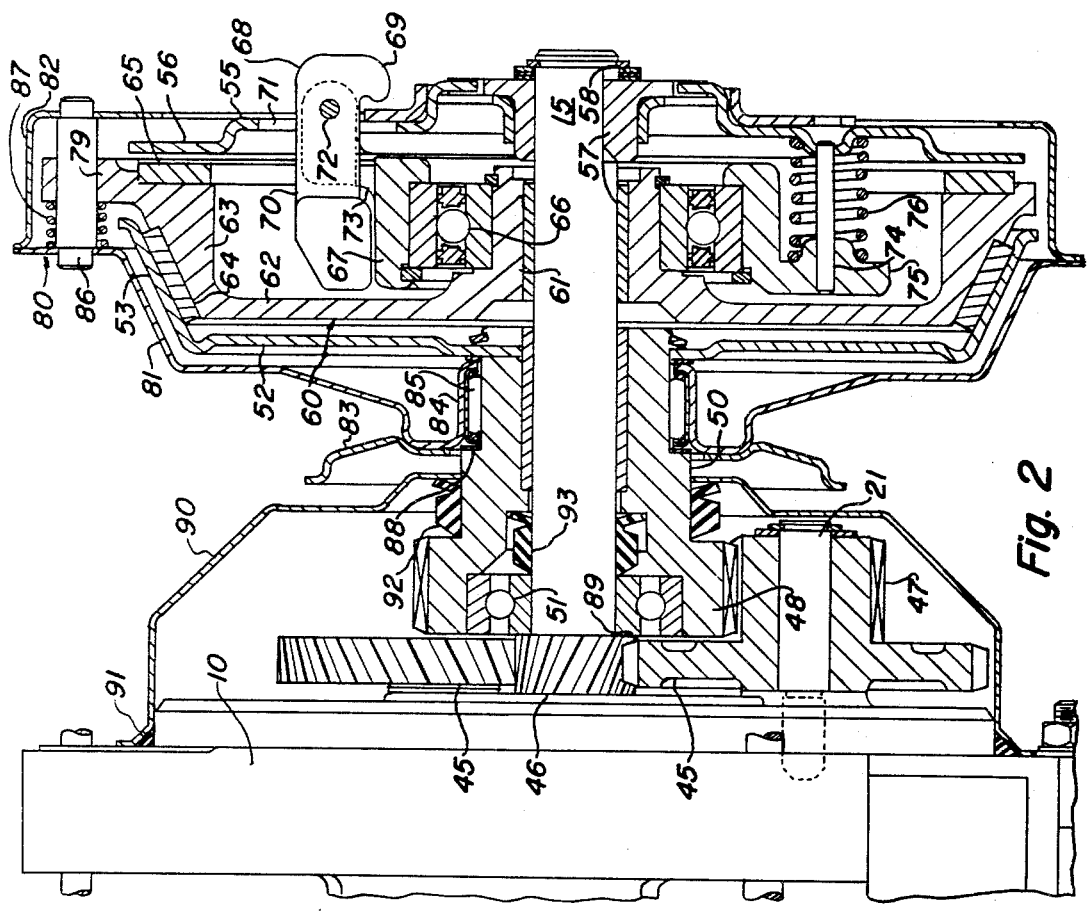
FIGURE 2 is a longitudinal cross sectional view of the two speed drive mechanism.

Reference is made to FIG. 1 of the drawings, in which the improved drive mechanism is shown applied to a horizontal axis type of washing machine which is capable of washing and centrifugal water extraction. The machine comprises a perforated wash basket 5 which holds the clothes and which is rotated in a stationary tub 6. The perforated basket 5 is provided with a drive pulley 7 which in turn is driven by a belt 9 from the motor unit 10.

For washing it is preferred that the wash basket be rotated in one direction for a short period of time and then by changing the electrical connections (not shown) the basket is rotated at the same speed in the opposite direction. By means of a suitable switch 8 which is operated by a control and timer well known in the industry and which forms no part of this invention, the motor can be switched from 4 pole operation to 2 pole operation in which case the basket 5 is rotated at high speed for extracting the water from the clothes.

The gear unit in accordance with the invention is driven by an electric motor 10 of pole changing type capable of being run at a low speed as a 4 pole motor or at a high speed as a 2 pole motor. Thus on a supply at a frequency of 50 cycles per second the low working speed would be somewhat below the synchronous speed of 1500 r.p.m. whilst the high working speed would be somewhat below the synchronous speed of 3000 r.p.m. Moreover the gear unit is secured to the motor and serves to drive an output member in the form of a pulley 12 for the belt drive 9 to the washing container. The latter is to be driven at a low speed for washing and rinsing, and at a high speed, which is of the order of 14 times the low speed, for spin drying.

The gear reduction is effected with the aid of lay shafts rather than by means of an epicyclic gear. Thus a number of lay shafts 21 project from the end of the motor casing 10 around the main shaft 15 and carry gears 45 meshing with a pinion 46 formed on the motor shaft adjacent the end frame of the motor. Each lay shaft gear 45 is integral with a pinion 47 meshing with a gear 48 carried by a low speed driving sleeve 50. The latter is carried at the end adjacent the motor by means of a ball bearing 51 and at its opposite end carries a low speed clutch disc 52 having at its outer periphery a frusto-conical clutch cone 53. At its extreme end the motor shaft carries a high speed clutch disc 55 having at its outer edge a plane annular clutch face 56. This clutch disc 55 is secured by a key 57 and a circlip 58.

Mounted loosely on the motor shaft between the high speed and low speed clutch discs is an output clutch member 60. This comprises a hub 61 surrounding the motor shaft and connnected by an annual web 62 to an outer ring 63 affording a frusto-conical surface bearing a lining 64 to co-operate with the frusto-conical clutch surface 53 of the low speed clutch disc, and a plane annular face bearing a lining 65 to co-operate with the plane annular clutch face 56 of the high speed clutch disc. The outer surface of the hub carries a ball bearing 66 on which is mounted an annual actuating spider 67, which is accordingly constrained to move axially with the output clutch member but is free to rotate relatively to it. The actuting spider carriers a number of generally L shaped weights 68 each having a short limb 69 overlying the outer face of the high speed clutch disc 55 and a long limb 70 extending towards the motor through a hole 71 in the clutch disc. Each weight is pivoted on a pivot 72, in the region of the angle of the L, to one of a number of pairs of lugs 73 projecting from the spider 67. The end of the long limb 70 is heavily weighted.

Thus rotation of the high speed clutch disc 55, and with it the spider 67, tends to cause the weighted long limbs of the L shaped weights to fly outwards so that the ends of the short limbs bearing upon the outer face of the high speed clutch disc 55 draw the spider, and with it the output clutch member 60, towards the high speed clutch disc 55. The actuating spider 67 and the high speed clutch disc are connected by a number of pins 74 carried by peripheral lugs 75 on the spider, to ensure that they rotate together, and each pin is surrounded by a powerful helical compression spring 76 urging the spider, and hence the output member, way from the high speed clutch disc.

Thus, in operation, at low speed the powerful springs 76 keep the output member 60 in contact with the frusto-conical clutch surface 53 of the low speed clutch disc, and hence the output member is driven at the low gear ratio. When the motor speed reaches a predetermined value, the L shaped weights swing out so as to draw the output member 60 away from the frusto-conical surface 53 of the low speed clutch and into engagement with the plane annular surface 56 of the high speed clutch. The pressure exerted on the latter is directly related to the speed of the motor, and hence, in the manner already described, the load imposed on the motor is automatically adjusted to the torque that it is capable of exerting without reduction of speed. If the motor is capable of exerting a greater torque its speed will increase and a greater torque will be transmitted by the clutch.

A similar action occurs when the speed is reduced, since the engagement of the low speed clutch would tend to accelerate the motor due to the inertia of the load, and would impose some strain on the mechanism. Any such acceleration of the motor will of course tend to relieve the pressure of the low speed clutch, thereby automatically causing the motor to exert a controlled braking torque on the load, to slow it down at a desired but not excessive rate.

The output member 60 interposed between the low speed clutch member and the high speed clutch member is provided with a number of lugs 79 projecting radially outwards through the gap between those members to drive an output member 80 comprising a shell 81, 82 which partially encloses those members and a driving pulley 83 for a belt in a plane lying between the clutches and the motor. The inner periphery or hub 84 of the pulley portion of the shell may run on a roller bearing 85 or bush surrounding the low speed driving sleeve 50.

The output shell 80 is connected to the output clutch member 60 through longitudinal pins 86 passing through holes in the lugs of the latter, and hence does not partake of the axial movement of the output member. Light helical compression springs 87 surround the pins so as to hold the hub 84 of the shell against a shoulder 88 on the low speed driving sleeve 50.

It will be appreciated that the spring forces are in general contained within small sub-units, and none are transmitted to the motor shaft. Thus the axial forces exerted by the centrifugal weights act directly between the high speed clutch disc 55 and the output clutch spider 60 as do the powerful springs 76 which oppose them. The low speed driving sleeve 50 bears axially against its bearing 51 which in turn bears against a shoulder 89 of the motor shaft formed at the end of the driving pinion 46. The light springs 87 of the output shell hold these parts in engagement, whilst the heavy springs 76 and the centrifugal weights locate the output member 60 in relation to the high speed clutch disc 56 which is held on the motor shaft by means of the circlip 58 at its end. Thus in effect all the components mounted on the motor shaft are confined between the shoulder 89 at the end of the pinion and the circlip 58 at the end of the shaft.

The gear reduction comprising the gears 46, 45, 47 and 48 are enclosed within a housing 90 which is bolted to the end frame of the motor 10 and the joint therebetween is provided with a gasket 91. The low speed driving sleeve 50 surrounding the motor shaft 15 extends through a hole in the gear housing and the low speed driving sleeve 50 is fitted with a running seal 92 while the motor shaft 15 has a running seal 93 which engages a face of the low speed driving sleeve 50. Thus the low speed gear reduction can be operated in a bath of lubricant which is contained within the housing 90. It is noted the clutches themselves are not lubricated and operate dry.

With the arrangements described the high speed clutch is designed to transmit, without slipping, a torque that rises progressively from zero as the speed increases above a predetermined value. Similarly the low speed clutch is designed to transmit without slipping, a torque that rises progressively from zero as the speed falls below the predetermined value.

It is desirable that at least the high speed centrifugal clutch and preferably both centrifugal clutches should have negligible differential or hysteresis or self-servo effect. That is to say the speed at which the clutch engages when the speed is varying in one direction should be substantially the same as the speed at which it disengages when the speed is varying in the opposite direction.

The features referred to above are particularly desirable when the motor is of a type in which the torque falls off considerably as the speed falls towards zero. Thus in an induction motor of the capacitor-run type (also known as a permanent split capacity motor) a single capacitor is permanently connected in series with an auxiliary winding, and normally being designed to give effective two phase operation at full load, has a very poor torque at low speeds. For many applications this rules it out and makes it necessary to employ the more expensive capacitor-start capacitor-run type of motor (also known as a two-value capacitor motor) which has one capacitor permanently connected to the auxiliary winding for running and an additional capacitor brought in by an automatic switch only for starting and running up to speed. Thus the features referred to may make it practicable to employ a motor of capacitor-run type rather than the more expensive capacitor-start capacitor-run type.

Thus, when the electrical connections are changed so as to switch the power unit from the low speed to the high speed, both the power unit and the driven member will accelerate together in the low gear ratio until the power unit reaches a predetermined speed at which the low speed clutch will disengage. Thereupon the power unit will immediately accelerate rapidly to the slightly higher speed at which the high speed clutch engages so as to render the high gear ratio effective.

Assuming that the clutch is of a type that immediately transmits a powerful torque, even if it is of such a type as to prevent an undesirable jolt, it is nonetheless unavoidable that either the driven member rapidly accelerates or the motor rapidly decelerates. In the case of a washing machine in which the driven member is a comparatively heavy container, with clothes and washing liquid in it, it is inevitable that motor should be substantially decelerated. In practice this may well mean that the speed of the motor is reduced to a value at which the torque is very much less than the maximum working torque. In fact it is just in these conditions that the maximum torque is a desirable in order to accelerate the washing container rapidly through its critical speed, and accordingly the reduction of speed and torque of the motor is particularly undesirable.

In the arrangement in accordance with the present invention when the motor reaches a predetermined speed the high speed centrifugal clutch begins to engage so as to exert a torque tending to accelerate the load and decelerate the motor. If the torque exerted by the clutch is greater than the driving torque exerted by the motor the motor will be slightly slowed down, whereupon the torque will immediately fall so as to prevent any further reduction in speed of the motor. The torque transmitted by the clutch will thus adjust itself to the value which the motor is capable of exerting without loss of speed, and as a result the driven member will be accelerated at the maximum rate of which the motor is capable. Conversely if the slip is excessive and the speed of the motor increases above the predetermined value, the grip of the clutch will thereby be increased so as to transmit a higher accelerating torque to the driven member. Thus if the motor is capable of exerting a higher torque than that which at any moment of the clutch is transmitting it will accelerate and increase the value of the latter torque.

Similarly when the motor is switched to its low speed the low speed clutch can slip to exert a controlled braking torque on the load.

I claim:

1. An electric motor drive for driving a part of a washing machine at either of two widely different speeds, including a pole changing motor having a single output pulley mounted rotatably on the shaft of said motor, a low ratio gear transmission connected to said motor shaft and connectable to said output pulley by means of a low speed friction clutch member, a high speed friction clutch member directly driven from said motor shaft, a centrifugal device means responsive to the motor speed supported between said low speed friction clutch member and said high speed clutch member, said centrifugal device means being the common driving connection to said low speed and said high clutch members, said centrifugal device means moving axially on said motor shaft upon an increase in speed above a predetermined value to disengage its connection to said low speed friction clutch member and to thereupon engage said high speed friction clutch member.

2. The device of claim 1 in which said centrifugal device means includes an actuating spider mounted to rotate relatively to and move axially with the common driving connection of said centrifugal device and is connected to said high speed friction clutch members by spring members tending to engage the low speed clutch member, and by centrifugal weights tending to engage said high speed clutch member, said spring members and said weights so arranged that the forces exerted by said springs and said weights are directly opposed and only the resultant force of said springs and said weights are transmitted to said common driving connection.

3. The drive of claim 2 in which the said output pulley is mounted on a bearing carried by a sleeve on the output gear of said low ratio gear transmission, and means are provided to prevent said output pulley from moving axially relative to said sleeve and said low speed friction clutch member.

4. The drive of claim 1 in which the said output pulley is mounted on a bearing carried by a sleeve on the output gear of said low ratio gear transmission, and means are provided to prevent said output pulley from moving axially relative to said sleeve and said low speed friction member.

5. The drive of claim 1 in which said output pulley is formed integrally with a casing structure to enclose a portion of the high and low speed clutch members.

6. The drive of claim 1 in which said low ratio gear transmission is enclosed in a housing attached to the end frame of said motor and said housing contains a lubricant for said low ratio gear reduction.

References Cited

UNITED STATES PATENTS

| 2,496,937 | 2/1950 | Edwards | 74—336 |
| 3,101,625 | 8/1963 | Horvath | 74—336 |
| 3,306,133 | 2/1967 | Rhein et al. | 74—861 |

FRED C. MATTERN, JR., *Primary Examiner.*

H. S. LAYTON, *Assistant Examiner.*